US010618479B2

United States Patent
Mijac (10) Patent No.: US 10,618,479 B2
(45) Date of Patent: Apr. 14, 2020

(54) CONTROLLER FOR A MULTI-VOLTAGE ON-BOARD POWER SUPPLY SYSTEM IN A VEHICLE

(71) Applicant: Brose Fahrzeugteile GmbH & Co. Kommanditgesellschaft, Bamberg, Bamberg (DE)

(72) Inventor: Anto Mijac, Bamberg (DE)

(73) Assignee: BROSE FAHRZEUGTEILE GMBH & CO. KOMMANDITGESELLSCHAFT, Bamberg (DE)

( * ) Notice: Subject to any disclaimer, the term of this patent is extended or adjusted under 35 U.S.C. 154(b) by 301 days.

(21) Appl. No.: 15/123,615

(22) PCT Filed: Mar. 5, 2015

(86) PCT No.: PCT/EP2015/054574
§ 371 (c)(1),
(2) Date: Sep. 2, 2016

(87) PCT Pub. No.: WO2015/132326
PCT Pub. Date: Sep. 11, 2015

(65) Prior Publication Data
US 2017/0072881 A1    Mar. 16, 2017

(30) Foreign Application Priority Data

Mar. 5, 2014 (DE) .................. 10 2014 203 968

(51) Int. Cl.
*B60L 1/00* (2006.01)
*B60R 16/03* (2006.01)
(Continued)

(52) U.S. Cl.
CPC ............. *B60R 16/03* (2013.01); *H02J 3/14* (2013.01); *H02J 2001/008* (2013.01)

(58) Field of Classification Search
USPC ........................................ 307/10.1
See application file for complete search history.

(56) References Cited

U.S. PATENT DOCUMENTS 5,796,175 A    8/1998 Itoh et al.
5,962,928 A    10/1999 Schenk
(Continued)

FOREIGN PATENT DOCUMENTS

DE    196 51 612 A1    6/1998
DE    199 21 451 C1    5/1999
(Continued)

*Primary Examiner* — Rexford N Barnie
*Assistant Examiner* — Dru Parries
(74) *Attorney, Agent, or Firm* — Lewis Roca Rothgerber Christie LLP (57) ABSTRACT

A controller for a multi-voltage on-board power supply system in a vehicle is provided. The controller comprises a first control module which is connected via a first supply path to a first supply voltage connection of the controller and/or to a first ground connection of the controller in order to be supplied with current at a first supply voltage of the multi-voltage on-board power supply system and a second control module which is connected via a second supply path to a second supply voltage connection of the controller and/or to a second ground connection of the controller in order to be supplied with current at a second supply voltage of the multi-voltage on-board power supply system. The second supply path contains a switching module which is designed to selectively block the second supply path or switch the second supply path in a conductive state depending on a control signal.

13 Claims, 2 Drawing Sheets

(51) Int. Cl.
*H02J 3/14* (2006.01)
*H02J 1/00* (2006.01)

(56) References Cited

U.S. PATENT DOCUMENTS

| | | |
|---|---|---|
| 6,455,949 B1 | 9/2002 | Blauensteiner et al. |
| 2008/0006491 A1 | 1/2008 | Degoul et al. |
| 2010/0207674 A1 | 8/2010 | Holzmann et al. |
| 2013/0278055 A1 | 10/2013 | Herbig et al. |

FOREIGN PATENT DOCUMENTS

| | | |
|---|---|---|
| DE | 103 48 162 B3 | 1/2005 |
| DE | 103 53 476 A1 | 6/2005 |
| DE | 10 2007 01 4383 A1 | 10/2008 |
| DE | 10 2013 207 084 A1 | 10/2013 |
| WO | WO 2008/010062 A1 | 1/2008 |
| WO | WO 2009/012834 A2 | 1/2009 |

CONTROLLER FOR A MULTI-VOLTAGE ON-BOARD POWER SUPPLY SYSTEM IN A VEHICLE

CROSS-REFERENCE TO A RELATED APPLICATION

This application is a National Phase Patent Applications of International Patent Application. Number PCT/EP2015/054574, filed on Mar. 5, 2015, which claims priority of German Patent Application Number 10 2014 203 968.1, filed on Mar. 5, 2014.

BACKGROUND

The invention relates to a controller for a multi-voltage on-board power supply system in a vehicle and a method for operating a controller for a multi-voltage on-board power supply system in a vehicle.

Multi-voltage on-board power supply systems are occasionally installed in vehicles, such as automobiles, trucks, trains and the like. A multi-voltage on-board power supply system normally comprises a first subsystem which is operated at the first supply voltage, and a second subsystem which is operated at the second supply voltage. In particular, the 12 V subsystem and the 48 V subsystem for automobiles are known in this context.

In order to control a component, for example a pump, which is operated by one of the two subsystems or by both subsystems, a controller is normally provided which comprises a first control module and a second control module. The first control module is normally designed for operation at the first supply voltage of the multi-voltage on-board power supply system, and the second control module is normally designed for operation at the second supply voltage. For this purpose, the first control module is connected via a first supply path to a first supply voltage connection of the controller and/or to a first around connection of the controller in order to be supplied with current at the first supply voltage. The same applies accordingly to the second control module which is connected via a second supply path to a second supply voltage connection of the controller and/or to a second ground connection of the controller in order to be supplied with current at the second supply voltage. Voltage transformers can be provided in both supply paths so that a respectively transformed supply voltage is fed to the control modules.

The two control modules can be interconnected via a control signal path in order to exchange control signals with one another.

One problem with a generic controller for a multi-voltage on-board power supply system in a vehicle is that transient currents can occur within the multi-voltage on-board power supply system, for example in said control signal path, which can damage or destroy units of the multi-voltage on-board power supply system, in particular units of the controller. In addition, at a constantly applied first supply voltage and second supply voltage, leakage currents can occur, facilitated, for example, by electrochemical migration (humidity), which can similarly result in damage to the multi-voltage on-board power supply system, in particular to the controller for the multi-voltage on-board power supply system.

SUMMARY

An underlying technical object of the present invention is therefore to guarantee more reliable operation of a multi-voltage on-board power supply system in a vehicle.

According to a first aspect of the invention, this object is achieved by a controller with the features as described herein. The object is furthermore achieved according to a second aspect of the invention by a method for operating a controller for a multi-voltage on-board power supply system in a vehicle with the features as described herein.

In the controller of the first aspect of the present invention, the second supply path contains a switching module which is designed to selectively block the second supply path or switch the second supply path in a conductive state depending on a control signal.

If the second supply path is blocked, the second control module is not supplied with current. No current flows via the second supply path if said path is blocked by the switching module. The second supply voltage is preferably not applied to the second control module if the second supply path is blocked. The occurrence of short-circuits, leakage currents or similar faults in the controller is thereby prevented. In addition, components of the controller can be of smaller design, as a result of which controller costs can be reduced. Due to the facility to block the second supply path, savings can furthermore be made in terms of materials and components which otherwise provide protection against the aforementioned faults, for example leakage currents caused by electrochemical migration. On the whole, a reliable operation of the multi-voltage on-board power supply system is possible by means of the controller according to the invention.

If the second supply path is switched in a conductive state by the switching module, current can be fed to the second control module via the second supply connection at the second supply voltage. The switching module is preferably designed in such a way that minimal to no conductivity losses occur.

The switching module can be installed in a simple manner in existing controllers or can even be taken into account in the design of the controller. The switching module can be installed at low cost in the controller. The control signal can be generated, in particular, in an essentially logic-free manner, i.e. without signal evaluation, which will be explained in more detail later. The present invention thus achieves a significantly more reliable operation of a multi-voltage on-board power supply system with simple means.

The components of the controller according to the invention are explained in detail below:

The controller according to the invention is designed for use in a multi-voltage on-board power supply system in a vehicle. It serves, for example, to control a component, e.g. a pump, which is operated at the first supply voltage and/or at the second supply voltage. The second supply voltage is normally higher than the first supply voltage. The first supply voltage is, for example, 12 V, and the second supply voltage is 48 V. Both supply voltages are preferably DC voltages.

In order to control a component which is operated by the first and/or the second subsystem, the controller comprises said first control module, which may be designed for operation at the first supply voltage, and said second control module, which may be designed for operation at the second supply voltage.

In the controller, a first supply path is provided which connects the first control module to a first supply voltage connection of the controller and/or to a first ground connection of the controller so that the first control module can be supplied with current at the first supply voltage. In normal operation of the controller, the first supply voltage, for example, is applied to the first supply voltage connection so that current is fed to the first control module via the first supply voltage connection at the first supply voltage. The voltage applied to the first supply voltage connection may also differ from the first supply voltage, for example in the event of a fault or if the controller is switched to an idle mode or is switched off. The first supply voltage is, for example, a DC voltage and is, for example, approximately 12 V. A voltage transformer, in particular a DC voltage transformer, can be provided in the first supply path so that a transformed first supply voltage can be fed to the first control module via the first supply path.

Furthermore, a second supply path is provided which connects the second control module to a second supply voltage connection of the controller and/or to a second ground connection of the controller so that the second control module can be supplied with current at the second supply voltage. In normal operation of the controller, the second supply voltage is, for example, applied to the second supply voltage connection so that current is fed to the second control module via the second supply voltage connection at the second supply voltage. However, the voltage applied to the second supply voltage connection may also differ from the second supply voltage, for example in the event of a fault. The second supply voltage is, for example, a DC voltage and is, for example, approximately 48 V. A voltage transformer, in particular a DC voltage transformer, can similarly be provided in the second supply path so that a transformed second supply voltage can be fed to the second control module via the second supply path.

The controller comprises, for example, a housing in which both the first control module and the second control module are integrated. The two supply voltage connections and the two ground connections form interfaces via which the controller can receive the first supply voltage and the second supply voltage. The two ground connections are disposed, for example, spatially separated from one another on the housing, but are connected outside the controller to the same ground, for example to the vehicle ground.

The first control module does not necessarily have to be designed as an integrated module, but may comprise one or more first control elements and further first components which may also be disposed spatially separated from one another. The same applies accordingly to the second control module.

The first control module comprises, for example, a microcontroller. The second control module comprises, for example, a control signal transceiver, such as a Local Interconnect Network (LIN) transceiver. Along with the control signal transceiver, the second control module comprises, for example, no further components, in particular no further microcontroller.

The first control module and the second control module may be interconnected via at least one control signal path so that control signals can be transmitted from the first control module to the second control module and/or control signals can be transmitted from the second control module to the first control module.

The first supply voltage and the second supply voltage are in each case preferably a DC voltage. Both the first supply path and the second supply path may in each case comprise one or more DC voltage transformers so that transformed supply voltages can be provided to first components of the first control module and/or to second components of the second control module. DC voltage transformers of this type may also be designed as part of the first control module or as part of the second control module, instead of being installed in the supply paths concerned.

According to the invention, the second supply path contains the switching module which selectively blocks the second supply path or switches the second supply path in a conductive state depending on the control signal in order to either prevent or ensure the power supply at the second supply voltage. If the second supply path is blocked, no current is therefore supplied to the second control module. The switching module can be installed either in a first part of the second supply path which is located between the second supply voltage connection and a supply input of the second control module and/or in a second part of the second supply path which is located between a supply output of the second control module and the second ground connection. In all cases, a deactivation of the second supply path by the switching module results in a prevention of the current flow via the second supply path and an activation results in a guarantee of the current flow via the second supply path.

The switching module is designed, for example, to assume either an activated state or a deactivated state depending on the control signal, wherein the second supply path is switched in a conductive state in the activated state in order to ensure the power supply at the second supply voltage, and wherein the second supply path is blocked in the deactivated state of the switching module in order to prevent the power supply at the second supply voltage. Such a function of the switching module can be guaranteed, for example, by a controllable switch which comprises a control signal input to receive the control signal and which is designed to be switched depending on the control signal. The controllable switch is, for example, a MOSFET, such as, for example, a p-channel MOSFET, or a different transistor type. The controllable switch preferably has a low conductivity resistance in order to cause minimal to no conductivity losses in the activated state. The conductivity losses occur if current is fed to the second control module at the second supply voltage via the second supply path which contains the switching module. This current then also flows via the controllable switch.

Further preferred embodiments of the controller according to the invention are described below. The further features of these preferred embodiments can be combined with one another and also with the optional features already described above to form further embodiments, unless they are expressly described as alternative to one another.

In one preferred embodiment, the controller is designed to generate the control signal depending on a voltage applied to the first supply voltage connection.

If, for example, the first supply voltage, i.e. 12 V, for example, is applied to the first supply voltage connection, the controller preferably generates the control signal in such a way that the switching module does not block the second supply path, but switches it in a conductive state in order to ensure the power supply for the second control module at the second supply voltage.

If the voltage applied to the first supply voltage connection differs from the first supply voltage, for example because a fault has occurred and/or the controller has switched to an idle mode, the controller generates the control signal preferably in such a way that the switching module blocks the second supply path in order to prevent the power supply for the second control module at the second supply voltage.

Such a generation of the control signal by the controller depending on the voltage applied to the first supply voltage connection can be implemented in a simple manner by means of a transistor, as will be explained in detail later. This embodiment in any event offers the advantage that the second supply path can be blocked automatically if the voltage applied to the first supply voltage connection differs from the first supply voltage, for example 12 V. If, for example, the first control module is switched to an idle mode by switching off the first supply voltage, i.e. the voltage on the first supply voltage connection is approximately 0 V, this switching to the idle mode automatically has the result that the second supply path is blocked. In this way, it is automatically ensured that no short circuits and/or stray currents or leakage currents occur in the second controller. The generation of the control signal depending on the voltage applied to the first supply voltage connection can essentially be carried out in a "logic-free" manner, i.e. without signal evaluation. It is, for example, ensured in the controller simply through switching technology that a difference between the voltage applied to the first supply voltage connection and the first supply voltage causes the switching module to block the second supply path, and to switch it in a conductive state when the first supply voltage is applied to the first supply voltage connection so that the second control module can be supplied with current at the second supply voltage.

In a further preferred embodiment, the controller is designed to generate the control signal depending on a fault signal and/or depending on a defective supply voltage, wherein the defective supply voltage occurs if at least one of the following conditions prevails:
the first control module is no longer connected to the first ground connection;
the second control module is no longer connected to the second ground connection;
a short circuit is present in a first subsystem of the multi-voltage on-board power supply system and/or in a second subsystem of the multi-voltage on-board power supply system, wherein the first subsystem is operated at the first supply voltage and the second subsystem is operated at the second supply voltage; or
a difference in potential between the first ground connection and the second ground connection exceeds a threshold value.

The controller may have an evaluation unit in order to detect a defective supply voltage of this type and/or to receive a fault signal of this type. An evaluation unit of this type can be connected to the first supply voltage connection, to the second supply voltage connection, to the first ground connection and/or to the second ground connection in order to detect the defective supply voltage and/or to generate or receive the fault signal.

The defective supply voltage occurs, for example, if the first control module and/or the second control module is/are no longer connected to ground. An event of this type is also referred to as a "ground break" or "ground loss". The defective supply voltage furthermore occurs if a short circuit has occurred in the first subsystem and/or in the second subsystem and/or a difference in potential between the two ground connections exceeds a threshold value, such as, for example, +/−1 V. The latter fault case is also referred to as a "ground offset". The amount of the threshold value can be predefined.

The controller generates the control signal for the switching module, for example, in the case of a defective supply voltage in such a way that the switching module blocks the second supply path in order to prevent the supply of the second control module at the second supply voltage. If no defective supply voltage and no fault signal occur, the controller generates the control signal, for example, in such a way that the switching module switches the second supply path in a conductive state so that the second control module can be supplied with current at the second supply voltage.

A monitoring unit is provided, for example, to monitor the multi-voltage on-board power supply system. The monitoring unit of the multi-voltage on-board power supply system feeds the fault signal, for example, to the controller. The monitoring unit generates the fault signal, for example, if a state occurs in the multi-voltage on-board power supply system which requires a deactivation of the second supply voltage in the controller or in which a deactivation of the second supply voltage in the controller is appropriate. For example, the controller generates the control signal on receiving the fault signal in such a way that said control signal causes the switching module to block the second supply path.

The embodiments described above can also be combined with one another. The controller is designed, for example, to generate the control signal for the switching module not only depending on the voltage applied to the first supply voltage connection, but also depending on a defective supply voltage and/or depending on the fault signal. For example, the controller generates the control signal in such a way that the second supply path is switched in a conductive state by the switching module only if the voltage applied to the first supply voltage connection does not differ from the first supply voltage, no defective supply voltage of any type whatsoever occurs and no fault signal is present. As soon as a defective supply voltage occurs and/or the fault signal indicates that the deactivation of the second supply path is necessary or appropriate, and/or as soon as the voltage applied to the first supply voltage connection differs from the first supply voltage, the controller generates the control signal for the switching module in such a way that the switching module blocks the second supply path so that the supply of the second control module with current at the second supply voltage is prevented.

In a further preferred embodiment of the controller, the switching module is connected via a control signal path to the first supply voltage connection in order to receive the control signal. In this embodiment, the voltage applied to the first supply voltage connection acts directly on the control signal therefore directly on the state of the switching module.

The control signal path contains, for example, a transistor which has a transistor control input, a power signal input and a power signal output. The transistor control input is connected, for example, to the first supply voltage connection so that the voltage applied to the first supply voltage connection controls the transistor. The power signal output of the transistor is connected, for example, to the second ground connection and the power signal input is connected to both the second supply voltage connection and the switching module in order to feed the control signal to the switching module. The transistor of the controller therefore generates a control signal for the switching module depending on the voltage applied to the first supply voltage connection.

The transistor is, for example, disposed in the control signal path in such a way that, as a result of the first supply voltage applied to the first supply voltage connection, the control signal generated by the transistor causes the switching module to switch the second supply path in a conductive state, and in such a way that, as a result of a difference between a voltage on the first supply voltage connection and the first supply voltage, the control signal generated by the transistor causes the switching module to block the second supply path.

As mentioned, in a preferred embodiment of the controller according to the invention, the switching module contains a controllable switch, wherein the controllable switch preferably has a control signal input to receive the control signal and is designed to be switched depending on the control signal. The controllable switch is, for example, a transistor, for example a p-channel MOSFET, which preferably comprises a lower conductivity resistance, so that conductivity losses can be largely avoided if the second control module draws current via the second supply path.

Furthermore, the controllable switch has, for example, a current signal input and a current signal output, wherein the current signal input is preferably connected to the second supply voltage connection and the current signal output is preferably connected to a supply input of the second control module. Alternatively, the current signal input is connected to a supply output of the second control module and the current signal output is connected to the second ground connection.

The switching module with the controllable switch may also be contained in either a first part of the second supply path which is located between the second supply voltage connection and the supply input of the second control module or a second part of the second supply path which is located between the supply output of the second control module and the second ground connection. The second control module draws current via the supply input at the second supply voltage (or a transformed second supply voltage) and the control module outputs current via the supply output.

However, it is preferable that the switching module with the controllable switch is connected in said first part of the second supply path, i.e. between the second supply voltage connection and the supply input of the second control module. If the second supply path is blocked by the switching module, it is then ensured that the second supply voltage is not applied to the second control module. It is furthermore preferable that the controllable switch of the switching module is disposed in the immediate vicinity of the second supply voltage connection so that, if the second supply path is blocked, the voltage applied to the second supply voltage connection is applied only in the vicinity of the second supply voltage connection, but not in other areas of the controller. The distance between the current signal input of the controllable switch and the second supply voltage connection is therefore preferably short and is, for example, less than 1 cm.

In a further preferred embodiment, the power signal input of the transistor of the controller is connected to the control signal input of the controllable switch of the switching module, for example via a first ohmic resistor. The control signal input is furthermore preferably connected to the second supply voltage connection, for example via a second ohmic resistor. The two ohmic resistors form a voltage divider and the voltage applied between the two ohmic resistors represents the control signal for the controllable switch.

The controllable switch is therefore preferably switched depending on a voltage which is applied between the two ohmic resistors. The value of the voltage applied there is ultimately determined by the voltage which is applied to the first supply voltage connection, since the latter controls the transistor and therefore a current which flows via the two ohmic resistors. If the transistor is activated, the two ohmic resistors are connected in series and the voltage applied to the second supply voltage connection essentially drops via the two ohmic resistors. At least one of the two ohmic resistors is preferably high-impedance so that no conductivity losses ideally occur if the transistor is activated. If the transistor is deactivated due to the voltage applied to the first supply voltage connection, no current flows via the two ohmic resistors, so that the controllable switch blocks the second supply path as a result of the voltage applied between the two ohmic resistors. In this case, the current flow via the second supply path is prevented.

Instead of an ohmic resistor, a different impedance type can also be provided to form said voltage divider.

In a further preferred embodiment, the first control module has a control signal transceiver, for example a Local interconnect Network (LIN) transceiver which is connected via at least one control signal path to the second control module in order to supply the second control module with a first control signal and/or to receive a second control signal from the second control module. The first control module and the second control module can therefore be interconnected for communication via the at least one control signal path. In a further embodiment of the controller according to the invention, both the first and the second control modules and also the at least one control signal path can be integrated into the housing of the controller.

According to a second aspect of the present invention, the aforementioned object is achieved by a method for operating a controller for a multi-voltage on-board power supply system in a vehicle.

The method of the second aspect of the invention shares the advantages of the controller of the first aspect of the invention. Preferred embodiments of the method correspond to the preferred embodiments of the controller of the first aspect of the invention outlined above, particularly as defined in the dependent claims.

In a particularly preferred embodiment, the control signal is generated depending on a voltage applied to the first supply voltage connection. Alternatively or additionally, in a further preferred embodiment, the control signal is generated depending on a fault signal and/or depending on a defective supply voltage. Examples of a defective supply voltage and examples of the generation of the fault signal have already been described above.

BRIEF DESCRIPTION OF THE DRAWINGS

Further features and advantages of the invention are set out in the following description of example embodiments with reference to the figures.

DETAILED DESCRIPTION

Figure 1:
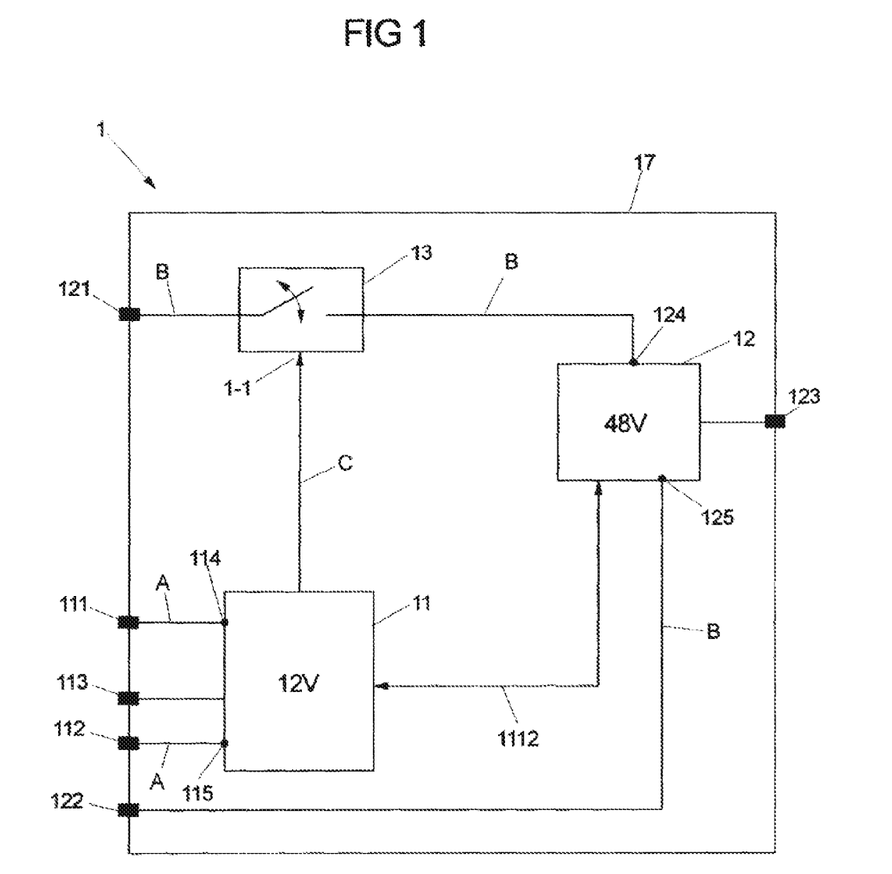
FIG. 1 shows, by way of example, a schematic representation of a first embodiment of a controller according to the first aspect of the invention.

FIG. 1 shows, by way of example, a schematic representation of a first embodiment of a controller 1. The controller 1 is provided for use in a multi-voltage on-board power supply system in a vehicle, for example an automobile. The multi-voltage on-board power supply system is, for example, the known 12 V/48 V multi-voltage on-board power supply system of an automobile.

The controller 1 comprises a first control module (12 V) 11 and a second control module (48 V) 12. Both control modules 11 and 12 are disposed in a housing 17 of the controller 1. A plurality of connections are provided on the housing 17. A first supply voltage is fed via a first supply voltage connection 111 and a first ground connection 112 to the controller 1. In normal operation of the controller 1, the first supply voltage of, for example, 12 V, is applied to the first supply voltage connection 111.

A second supply voltage of, for example, 48 V, is fed via a second supply voltage connection 121 and via a second ground connection 122 to the controller 1. Both ground connections 112 and 122 are connected, for example, outside the controller 1, i.e. outside the housing 17, to a common ground connection, for example to the vehicle ground.

A first control signal interface 113 is furthermore provided via which the first control module 11 can output signals and/or receive signals. A second control signal interface 123 is furthermore provided via which the second control module 12 can output signals and/or receive signals. The first control module 11 and the second control module 12 are interconnected via at least one control signal path 1112 so that the first control module 11 can feed a first control signal to the second control module 12 and/or can receive a second control signal from the second control module 12.

A first supply path A and a second supply path B are provided in order to supply the two control modules 111 and 12 in each case with a current required for the respective operation.

The first supply path A connects the first control module 11 to the first supply voltage connection 111 and to the first ground connection 112. Current is fed at the first supply voltage via this first supply path A to the first control module 11.

The second supply path B connects the second control module 12 to the second supply voltage connection 121 and to the second ground connection 122. Current is fed at the second supply voltage via the second supply path B to the second control module 12 in normal operation of the controller 1.

In order to receive and output current, the first control module 11 comprises a first supply input 114 to which the voltage applied to the first supply voltage connection 111 is fed via the first supply path. A, and a first supply output 115 which is connected via the first supply path A to the first ground connection 112.

Similarly, in order to receive and output current, the second control module 12 comprises a supply input 124 which is connected via the second supply path B to the second supply voltage connection. 121, and a supply output 125 which is connected via the second supply path B to the second ground connection 122.

One or more voltage transformers can also be provided in each case in the supply paths A and B in order to supply the control modules 11 and 12 with transformed supply voltages. However, these voltage transformers are not shown in the figures.

The controller 1 furthermore comprises a switching module 13 which is disposed in the second supply path B. Depending on a control signal 1-1, the switching module 13 selectively blocks the second supply path B or switches the second supply path B in a conductive state in order to prevent or ensure the power supply at the second supply voltage. As a result of the deactivation of the second supply path B by the switching module 13, no current flows via the second supply path B.

In order to receive the control signal 1-1, the controller 1 comprises a control signal path C which is connected to the first supply voltage connection 111 so that the switching module 13 can receive the control signal 1-1. This will now be explained in detail using an example shown in FIG. 2.

Figure 2:
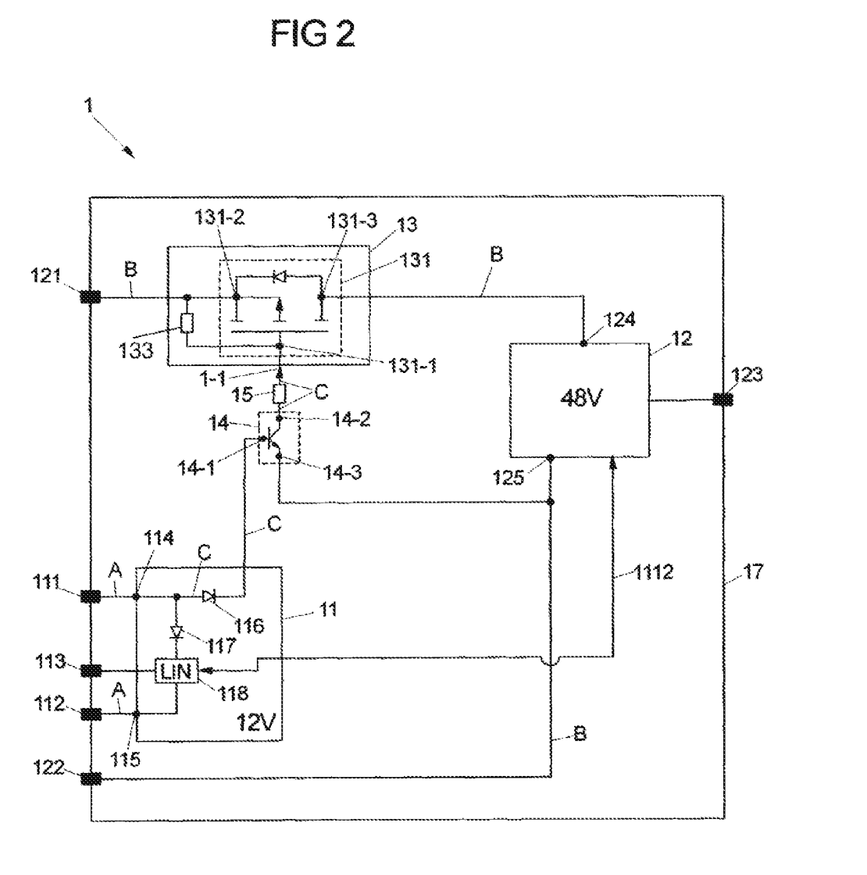
FIG. 2 shows, by way of example, a schematic representation of an example of an implementation of the controller shown in FIG. 1.

FIG. 2 shows an example of an implementation of the controller 1 shown in FIG. 1, wherein the same components of the controller 1 are denoted with the same reference numbers.

In the example embodiment according to FIG. 2, the switching module 13 comprises a controllable switch 131 (referred to below simply as the 'switch' 131). The switch 131 is switched depending on the control signal 1-1. In the activated state, the switch 131 switches the second supply path B in a conductive state so that the power supply is ensured via the second supply path B. In the activated state, the second control module 12 therefore receives a current at the voltage applied to the second supply voltage connection 121 in the deactivated condition, the switch 131 blocks the second supply path B. The current flow via the second supply path B is thereby prevented, so that the second control module 12 is not supplied with a current. The voltage applied to the second supply voltage connection 121 is not therefore applied to the second supply input 124 either.

In the example shown in FIG. 2, the controllable switch 131 is a p-channel MOSFET. However, other transistor types can, in principle, also be considered for the implementation of the function of the switching module 13. However, it is appropriate that the switch/transistor that is used has a low conductivity resistance in order to cause minimal, ideally no, conductivity losses in the activated state.

The controllable switch 131 is controlled by the control signal 1-1. In the example shown in FIG. 2, the control signal 1-1 is fed via the control signal path C to the switching module 13, i.e. the controllable switch 131. The control signal path C connects the switching module 13 to the first supply voltage connection 111. In other words, the controller 1 generates the control signal 1-1 depending on the voltage applied to the first supply voltage connection 111.

The control signal path C comprises a transistor 14 which has a transistor control input 14-1, a power signal output 14-3 and a power signal input 14-2. The transistor control input 14-1 is connected via a first diode 116 to the first supply voltage connection 111. The power signal output 14-3 is connected to the second ground connection 122, for example via the second supply path B, as shown in FIG. 2. The power signal input 14-2 of the transistor 14 is connected via a first ohmic resistor 15 to a first control signal input 131 of the controllable switch 131. In the case of a MOSFET, the control signal input 113-1 is the gate connection. The control signal input 113-1 is connected via a second ohmic resistor 133 to the second supply voltage connection 121. A current signal input 131-1 of the controllable switch 131 is similarly connected to the second supply voltage connection 121. In the case of a MOSFET, the current signal input 131-2 is, for example, a source connection. A current signal output 131-3 of the switch 131 is connected to the supply input 124 of the second control module. In the case of a MOSFET, the current signal output 131-3 is, for example, a drain connection.

The transistor 14 is, for example, a bipolar transistor, such as an npn-transistor. In this case, the transistor control input 14-1 is a base connection, the power signal output 14-3 is an emitter connection and the power signal input 14-2 is a collector connection.

If the first supply voltage of, for example, 12 V, is applied to the first supply voltage connection 111, the transistor 14 is activated. A current which is generated by the voltage applied to the second supply voltage connection 121 therefore flows via the first ohmic resistor 15 and the second ohmic resistor 133. The two ohmic resistors 15 and 133 form a voltage divider which predefines the voltage at the control signal input 131-1. This voltage represents the control signal 1-1.

Since a voltage drops in the activated state of the transistor 14 via the voltage divider formed by the two ohmic resistors 15 and 133, the controllable switch 131 is activated, i.e. switches the second supply path B in a conductive state, as a result of the voltage applied to the control signal input 131-1. A current at the voltage applied to the second supply voltage connection 121 is then supplied to the second control module 12 via the second supply path Be in normal operation of the controller 1, this voltage is identical to the second supply voltage, i.e., for example, 48 V.

If the voltage applied to the first supply voltage connection 111 differs from the first supply voltage, falling, for example, to approximately 0 V, because, for example, a defective supply voltage is present and/or the controller 1 is to be switched to an idle mode, the transistor 14 blocks. This automatically has the result that the voltage applied to the control signal input 131-1 drops or is at 0 V, so that the controllable switch 131 is switched off and blocks the second supply path. In this state, no current flows via the second supply path, so that the second control module 12 is not supplied with current.

For safety reasons, the first diode 116 is provided in the control signal path C. The first diode 116 ensures that the voltage applied to the second supply voltage connection. 121 is in no case fed to the first supply voltage connection 111 in the event of a defect in the transistor 14, but drops via the diode 116.

In the example shown in FIG. 2, the first control module 111 comprises a control signal transceiver (LIP) 118 which is connected via the control signal path 1112 to the second control module 12. The control signal transceiver 118 is designed, for example, as a LIN transceiver. The control signal transceiver 118 is connected via a second diode 117 to the first supply voltage connection 111. The second diode 117 implements a reverse voltage protection for the control signal transceiver 118.

The example embodiments of the controller 1 shown in both figures have been explained with reference to a 12 V/48 V multi-voltage on-board power supply system. However, the present invention is not limited to this type of multi-voltage on-board power supply system; instead, the first supply voltage and the second supply voltage may also have values other than 12 V or 48 V.

Furthermore, in the example embodiment shown, the switching module 13 is disposed in a first part of the second supply path B between the second supply voltage connection 121 and the second supply input 124 of the second control module 12. However, the switching module 13 could also be disposed in a second part of the second supply path B between the second supply output 125 of the second control module 12 and the second ground connection 122, and could selectively switch the second supply path B in a conductive state or block the second supply path B in this position also.

Instead of or in addition to the field effect transistor shown in FIG. 2, the switching module 13 may also comprise a bipolar transistor or a different transistor type. Similarly, the transistor 14 could be designed as a field effect transistor rather than a bipolar transistor.

It has been explained with reference to the example embodiments shown in FIG. 1 and FIG. 2 that the controller 1 generates the control signal 1-1 depending on the voltage applied to the first supply voltage connection 111. However, as already emphasized in the general part of the description, the control signal 1-1 may also be generated by the controller 1, additionally or alternatively to the generation depending on the voltage on the first supply voltage connection 111, depending on a defective supply voltage and/or depending on a fault signal. For these purposes, the control device 1 may comprise an evaluation unit (not shown in the figures) which detects a defective supply voltage of this type and/or receives a fault signal of this type.

A defective supply voltage occurs, for example, if the first control module 11 is no longer connected to the first ground connection 112, the second control module 12 is no longer connected to the second ground connection 122, a short circuit is present in a first subsystem of the multi-voltage on-board power supply system and/or in a second part of the multi-voltage on-board power supply system, and/or a difference in potential between the first ground connection 112 and the second ground connection 122 exceeds a threshold value of, for example, 1 V.

A monitoring unit (not shown in the figures) is provided, for example, to monitor the multi-voltage on-board power supply system. The monitoring unit may likewise be installed in the housing 17 of the controller 1. Alternatively, the monitoring unit is installed outside the housing 1. For example, the monitoring unit of the multi-voltage on-board power supply system feeds the fault signal to the controller 1. The monitoring unit generates the fault signal, for example, if a state occurs in the multi-voltage on-board power supply system which requires a deactivation of the second supply voltage in the controller 1 or in which a deactivation of the second supply voltage in the controller 1 is appropriate. For example, the controller 1 generates the control signal 1-1 on receiving the fault signal in such a way that said control signal causes the switching module 13 to block the second supply path B.

The first diode 116 and the second diode 117 shown in FIG. 2 could also be disposed outside the first control module 11. The same applies accordingly to the second ohmic resistor 133. This ohmic resistor 133 could also be disposed outside the switching module 13.

REFERENCE NUMBER LIST/ABBREVIATIONS USED

1 Controller
1-1 Control signal
11 First control module
111 First supply voltage connection
1112 Control signal path
112 First ground connection
113 First control signal interface
114 First supply input
115 Second supply output
116 First diode
117 Second diode
118 Control signal transceiver
12 Second control module
121 Second supply voltage connection
122 Second ground connection
123 Second control signal interface
124 Second supply input
125 Second supply output
13 Switching module
131 Controllable switch
131-1 Control signal input
131-2 Current signal input
131-3 Current signal output
133 Second ohmic resistor
14 Transistor 14-1 Transistor control input
14-2 Power signal input
14-3 Power signal output
15 First ohmic resistor
17 Housing
A First supply path
B Second supply path
C Control signal path

The invention claimed is:

1. A controller for a multi-voltage on-board power supply system in a vehicle, the controller comprising:
   a first control module which is connected via a first supply path to a first supply voltage connection of the controller and/or to a first ground connection of the controller in order to be supplied with current at a first supply voltage of the multi-voltage on-board power supply system; and
   a second control module which is connected via a second supply path to a second supply voltage connection of the controller and/or to a second ground connection of the controller in order to be supplied with current at a second supply voltage of the multi-voltage on-board power supply system;
   wherein the second supply path contains a switching module which is designed, depending on a control signal, either to block the second supply path or to switch the second supply path into a conductive state, wherein the switching module is connected via a control signal path to the first supply voltage connection to receive the control signal, wherein the control signal Path contains a transistor which has a transistor control input, a power signal input and a power signal output, wherein the transistor control input is connected to the first supply voltage connection, wherein the power signal input is connected to the second supply voltage connection and the switching module in order to feed the control signal to the switching module, and wherein the power signal output is connected to the second around connection; and
   wherein the controller is designed to generate the control signal to switch the second supply path into the conductive state when current at the first supply voltage is supplied to the first supply path and/or
   wherein the controller is designed to generate the control signal to automatically block the second supply path depending on a fault signal and/or depending on a defective supply voltage, wherein the defective supply voltage occurs if at least one of the following conditions prevails:
   the first control module is no longer connected to the first ground connection;
   the second control module is no longer connected to the second ground connection;
   a short circuit is present in a first subsystem of the multi-voltage on-board power supply system and/or in a second subsystem of the multi-voltage on-board power supply system, wherein the first subsystem operates normally at the first supply voltage and the second subsystem is operated at the second supply voltage; or
   a difference in potential between the first ground connection and the second ground connection exceeds a threshold value.

2. The controller as claimed in claim 1, wherein the switching module is designed to assume either an activated state or a deactivated state depending on the control signal, wherein the second supply path is conductive in the activated state in order to ensure the power supply at the second supply voltage, and wherein the second supply path is blocked in the deactivated state in order to prevent the power supply at the second supply voltage.

3. The controller as claimed in claim 1, wherein the switching module comprises a controllable switch with a control signal input to receive the control signal, wherein the controllable switch is designed to be switched depending on the control signal.

4. The controller as claimed in claim 3, wherein the controllable switch has a current signal input and a current signal output, wherein
   the current signal input is connected to the second supply voltage connection and the current signal output is connected to a supply input of the second control module; or
   the current signal output is connected to the second ground connection and the current signal input is connected to a supply output of the second control module.

5. The controller as claimed in claim 1, wherein the switching module comprises a controllable switch with a control signal input to receive the control signal, wherein the controllable switch is designed to be switched depending on the control signal, and wherein the power signal input of the transistor is connected to the control signal input of the controllable switch via a first ohmic resistor.

6. A controller for a multi-voltage on-board power supply system in a vehicle, the controller comprising:
   a first control module which is connected via a first supply path to a first supply voltage connection of the controller and/or to a first ground connection of the controller in order to be supplied with current at a first supply voltage of the multi-voltage on-board power supply system; and
   a second control module which is connected via a second supply path to a second supply voltage connection of the controller and/or to a second ground connection of the controller in order to be supplied with current at a second supply voltage of the multi-voltage on-board power supply system;
   wherein the second supply path contains a switching module which is designed, depending on a control signal, either to block the second supply path or to switch the second supply path into a conductive state;
   wherein the switching module comprises a controllable switch with a control signal input to receive the control signal, wherein the controllable switch is designed to be switched depending on the control signal;
   wherein the controller is designed to generate the control signal to switch the second supply path into the conductive state when current at the first supply voltage is supplied to the first supply path; and/or
   wherein the controller is designed to generate the control signal to automatically block the second supply path depending on a fault signal and/or depending on a defective supply voltage, wherein the defective supply voltage occurs if at least one of the following conditions prevails;
   the first control module is no longer connected to the first ground connection;
   the second control module is no longer connected to the second around connection;
   a short circuit is present in a first subsystem of the multi-voltage on-board power supply system and/or in a second subsystem of the multi-voltage on-board power supply system, wherein the first subsystem operates normally at the first supply voltage and the second subsystem is operated at the second supply voltage; or a difference in potential between the first ground connection and the second ground connection exceeds a threshold value, and wherein the control signal input is connected to the second supply voltage connection via a second ohmic resistor.

7. The controller as claimed in claim 1, wherein the first control module has a control signal transceiver, which is connected via at least one control signal path to the second control module in order to supply the second control module with a first control signal and/or to receive a second control signal from the second control module.

8. The controller as claimed in claim 1, wherein the controller has a housing in which the first control module, the second control module and the switching module are integrated.

9. The controller as claimed in claim 1, wherein the second supply voltage is higher than the first supply voltage.

10. A method for operating a controller for a multi-voltage on-board power supply system in a vehicle, wherein the controller has:

a first control module which is connected via a first supply path to a first supply voltage connection of the controller and/or to a first ground connection of the controller in order to be supplied with current at a first supply voltage of the multi-voltage on-board power supply system; and a second control module which is connected via a second supply path to a second supply voltage connection of the controller and/or to a second ground connection of the controller in order to be supplied with current at the second supply voltage of the multi-voltage on-board power supply system;

wherein the method comprises:

controlling a switching module provided in the second supply path depending on a control signal in order to switch the second supply path into a conductive state when current at the first supply voltage is supplied to the first supply path and/or to automatically block the second supply path depending on a fault signal and/or depending on a defective supply voltage, wherein the switching module is connected via a control signal path to the first supply voltage connection in order to receive the control signal, wherein the control signal path contains a transistor which has a transistor control input, a power signal input and a power signal output, wherein the transistor control input is connected to the first supply voltage connection wherein the power signal input is connected to the second supply voltage connection and the switching module in order to feed the control signal to the switching module and wherein the power signal output is connected to the second ground connection and wherein the defective supply voltage occurs if at least one of the following conditions prevails:

the first control module is no longer connected to the first ground connection;

the second control module is no longer connected to the second ground connection;

a short circuit is present in a first subsystem of the multi-voltage on-board power supply system and/or in a second subsystem of the multi-voltage on-board power supply system, wherein the first subsystem is operated at the first supply voltage and the second subsystem is operated at the second supply voltage; or a difference in potential between the first ground connection and the second ground connection exceeds a threshold value.

11. A controller for a multi-voltage on-board power supply system in a vehicle, the controller comprising:

a first control module which is connected via a first supply path to a first supply voltage connection of the controller and/or to a first ground connection of the controller in order to be supplied with current at a first supply voltage of the multi-voltage on-board power supply system; and a second control module which is connected via a second supply path to a second supply voltage connection of the controller and/or to a second ground connection of the controller in order to be supplied with current at a second supply voltage of the multi-voltage on-board power supply system;

wherein the second supply path contains a switching module which is designed to selectively block the second supply path or switch the second supply path in a conductive state depending on a control signal;

wherein the switching module is connected via a control signal path to the first supply voltage connection in order to receive the control signal; and wherein the control signal path contains a transistor which has a transistor control input, a power signal input and a power signal output, wherein the transistor control input is connected to the first supply voltage connection, wherein the power signal input is connected to the second supply voltage connection and the switching module in order to feed the control signal to the switching module, and wherein the power signal output is connected to the second ground connection;

wherein the controller is designed to generate the control signal to automatically block the second supply path depending on a fault signal and/or depending on a defective supply voltage, wherein the defective supply voltage occurs if at least one of the following conditions prevails;

the first control module is no longer connected to the first ground connection;

the second control module is no longer connected to the second ground connection;

a short circuit is present in a first subsystem of the multi-voltage on-board power supply system and/or in a second subsystem of the multi-voltage on-board power supply system, wherein the first subsystem operates normally at the first supply voltage and the second subsystem is operated at the second supply voltage; or a difference in potential between the first ground connection and the second ground connection exceeds a threshold value.

12. The controller as claimed in claim 11, wherein the switching module comprises a controllable switch with a control signal input to receive the control signal, wherein the controllable switch is designed to be switched depending on the control signal, and wherein the power signal input of the transistor is connected to the control signal input of the controllable switch via a first ohmic resistor.

13. The controller as claimed in claim 12, wherein the control signal input is connected to the second supply voltage connection via a second ohmic resistor.

* * * * *

UNITED STATES PATENT AND TRADEMARK OFFICE
CERTIFICATE OF CORRECTION

PATENT NO. : 10,618,479 B2
APPLICATION NO. : 15/123615
DATED : April 14, 2020
INVENTOR(S) : Anto Mijac It is certified that error appears in the above-identified patent and that said Letters Patent is hereby corrected as shown below:

In the Claims

Column 13, Line 31, Claim 1    delete "Path" and insert -- path --

Column 13, Line 39, Claim 1    delete "around" and insert -- ground --

Column 14, Line 59, Claim 6    delete "prevails;" and insert -- prevails: --

Column 14, Line 63, Claim 6    delete "around" and insert -- ground --

Column 16, Line 41 (approx.), Claim 11    delete "prevails;" and insert -- prevails: --

Signed and Sealed this
Nineteenth Day of January, 2021

Andrei Iancu
*Director of the United States Patent and Trademark Office*